United States Patent
Haworth et al.

(10) Patent No.: US 9,922,473 B1
(45) Date of Patent: Mar. 20, 2018

(54) SYSTEMS AND METHODS FOR LOCATION-BASED AUTOMATED AUTHENTICATION

(71) Applicant: UScontracting, Inc., Odenton, MD (US)

(72) Inventors: William Frederick Haworth, Sherwood Forest, MD (US); Kevin Austin Maynard, Annapolis, MD (US); Jeffrey Brader Kidwell, Stevensville, MD (US)

(73) Assignee: USCONTRACTING, INC., Odenton, MD (US)

( * ) Notice: Subject to any disclaimer, the term of this patent is extended or adjusted under 35 U.S.C. 154(b) by 0 days.

(21) Appl. No.: 15/412,321

(22) Filed: Jan. 23, 2017

(51) Int. Cl.
*G06Q 20/38* (2012.01)
*G06Q 20/32* (2012.01)
(Continued)

(52) U.S. Cl.
CPC ..... *G07C 9/00015* (2013.01); *G07C 9/00309* (2013.01); *H04H 60/91* (2013.01);
(Continued)

(58) Field of Classification Search
CPC ....... H04W 4/008; H04W 4/06; H04W 12/02; H04W 84/18; H04W 12/04; H04W 4/025; H04W 64/00; H04W 12/08; H04W 4/023; H04W 12/06; H04W 48/10; H04W 4/001; H04W 4/02; H04W 4/028; H04W 8/205; G01S 1/02; G01S 1/70; G01S 1/72; G01S 5/0018; H04H 60/90; H04H 20/61; H04H 20/62; H04H 60/51; H04H 60/63; G09C 5/00; H04M 3/42178; G06Q 30/02; G06Q 20/3224; G06Q 30/00; G06Q 30/0201; G06Q 30/0207; G06Q 30/0261; G06Q 30/0209; G06Q 30/0212; G06Q 30/0255; G06Q 30/0267; G06Q 30/0269;
(Continued)

(56) References Cited

U.S. PATENT DOCUMENTS

| 8,688,517 | B2 * | 4/2014 | Lutnick ............... G06Q 30/02 705/14.1 |
| 2010/0201536 | A1 | 8/2010 | Robertson et al. |

(Continued)

*Primary Examiner* — Dionne H Pendleton
(74) *Attorney, Agent, or Firm* — NEO IP

(57) ABSTRACT

Systems and methods for location-based automated authentication are disclosed. A system comprises a mobile device, a sensor and a backend platform. The sensor and the backend platform is in network communication. The mobile device is operable to continuously transmit Bluetooth Low Energy (BLE) signals comprising encrypted transitory identifiers. The sensor is operable to receive a BLE signal from the mobile device when the mobile device is within a predetermined range, and communicate over a network connection the encrypted transitory identifier comprised in the BLE signal to the backend platform. The backend platform is operable to extract a unique identifier and a changing encrypted identifier from the received encrypted transitory identifier, generate a changing encrypted identifier, and validate a user identification by comparing the generated changing encrypted identifier and the extracted encrypted transitory identifier.

15 Claims, 4 Drawing Sheets

(51) Int. Cl.

| | | |
|---|---|---|
| *H04W 12/04* | (2009.01) | |
| *G07C 9/00* | (2006.01) | |
| *H04W 12/06* | (2009.01) | |
| *H04W 4/00* | (2018.01) | |
| *H04L 29/06* | (2006.01) | |
| *H04W 92/10* | (2009.01) | |
| *H04H 60/91* | (2008.01) | |
| *H04W 92/04* | (2009.01) | |
| *H04L 29/08* | (2006.01) | |

(52) U.S. Cl.
 CPC ...... *H04L 63/0428* (2013.01); *H04L 63/0823* (2013.01); *H04L 67/20* (2013.01); *H04W 4/008* (2013.01); *H04W 12/04* (2013.01); *H04W 12/06* (2013.01); *H04W 92/045* (2013.01); *H04W 92/10* (2013.01); *G06F 2221/2151* (2013.01); *G07C 2009/00317* (2013.01); *G07C 2009/00412* (2013.01)

(58) Field of Classification Search
 CPC ......... G06Q 53/34; H04L 67/18; H04L 43/10; H04L 2209/76; H04L 2209/805; H04L 63/0414; H04L 63/0846; H04L 67/306; H04L 9/0637; G07F 17/3223; G07F 17/3227
 See application file for complete search history.

(56) References Cited

U.S. PATENT DOCUMENTS

| | | | |
|---|---|---|---|
| 2013/0214909 A1* | 8/2013 | Meijers | H04W 4/008 340/10.5 |
| 2013/0217332 A1* | 8/2013 | Altman | H04H 60/90 455/41.2 |
| 2013/0257589 A1 | 10/2013 | Mohiuddin et al. | |
| 2014/0220883 A1 | 8/2014 | Emigh et al. | |
| 2014/0375421 A1 | 12/2014 | Morrison et al. | |
| 2016/0055693 A1 | 2/2016 | Somani et al. | |
| 2017/0148018 A1* | 5/2017 | Levin | G06Q 20/202 |

* cited by examiner

SYSTEMS AND METHODS FOR LOCATION-BASED AUTOMATED AUTHENTICATION

BACKGROUND OF THE INVENTION

1. Field of the Invention

The invention relates to location-based automated authentication.

2. Description of the Prior Art

Personal mobile devices, especially smart phones, become so popular that almost everyone has one with them wherever they are. Modern communication technologies and various mobile applications have equipped smart phones with a variety of functions besides basic calling and texting. As one example, mobile devices are used for access authentication and validation.

By way of example the following are relevant prior art documents relating to access authentication and validation:

U.S. Patent Publication No. 20100201536 for "System and method for accessing a structure using a mobile device" by inventor William Benjamin Robertson et al., filed Feb. 10, 2009, describes a wireless device access system employs short-range wireless communication to detect the proximity of a user device to a structure and a wide-area data network to communicate an unlock request. The access system then authenticates the unlock request and the proximity of the user device prior to transmitting an unlock command to the structure. Additionally, the wireless device may require the proximity of a user token prior to operation and/or the access system may include an override within the structure blocking any unlock command. Besides providing access to the structure, the system may perform other functions, such as monitoring room occupancy, switching power on and off, and the like.

U.S. Patent Publication No. 20130257589 for "Access control using an electronic lock employing short range communication with mobile device" by inventor Mohammad Mohiuddin et al., filed Mar. 1, 2013, describes systems and methods for obtaining access to an area or an object secured by an electronic locking device. The methods involve: obtaining, by a Mobile Communication Device ("MCD"), a unique identifier associated with the Electronic Locking Device ("ELD") via a first Short Range Communication ("SRC"); communicating the unique identifier from MCD to a Remote Communication Device ("RCD") via a network connection; receiving at least one symbol associated with the unique identifier that facilitates unlocking of ELD from RCD via the network connection; and causing ELD to be unlocked by communicating a key from MCD to ELD via a second SRC.

U.S. Patent Publication No. 20140220883 for "Presence Detection Using Bluetooth and Hybrid-Mode Transmitters" by inventor Aaron T. Emigh et al., filed Feb. 4, 2014, describes presence detection using Bluetooth and hybrid-mode transmitters. In some embodiments, one or more transmitters are configured to transmit an iBeacon broadcast and a proprietary Bluetooth Low Energy (BTLE) broadcast, wherein at least one of the transmitted broadcasts includes an identifier that specifies a venue. The broadcasts are captured by a handset and decoded to infer presence of the handset at the venue.

U.S. Patent Publication No. 20140375421 for "Systems and methods for enabling access control via mobile devices" by inventor John David Morrison et al., filed Jun. 18, 2014, describes systems and methods for enabling access control via mobile devices. Embodiments of the invention have been particularly developed for allowing a user to gain access to a controlled functionality (for example the unlocking of a door) using a smartphone or the like. These leverage short-range wireless communications, such as Bluetooth Low Energy or Near Field Communications.

U.S. Patent Publication No. 20160055693 for "Validation in secure short-distance-based communication and enforcement system according to visual objects" by inventor Avishek Somani et al., filed Jun. 18, 2015, describes a secure short-distance-based communication and enforcement system validates users in a validation and enforcement area and can check if users in the validation and enforcement area have been validated. A visual object can be displayed on an enforcement computer and a mobile device of a user in the in the validation and enforcement area to determine if a user is validated. The visual object may be periodically changed.

SUMMARY OF THE INVENTION

Systems and methods for location-based automated authentication are disclosed. A system comprises a mobile device, a sensor and a backend platform. The sensor and the backend platform is in network communication. The mobile device is operable to continuously transmit Bluetooth Low Energy (BLE) signals comprising encrypted transitory identifiers. The sensor is operable to receive a BLE signal from the mobile device when the mobile device is within a predetermined range, and transmit an encrypted transitory identifier comprised in the BLE signal to the backend platform. The backend platform is operable to extract a unique identifier and a changing encrypted identifier from the received encrypted transitory identifier, generate a changing encrypted identifier, and validate a user identification by comparing the generated changing encrypted identifier and the extracted encrypted transitory identifier. An associated mobile application is installed on the mobile device. The associated mobile application is activated and send user identification parameters to the backend platform. The mobile application and the backend platform use the same algorithm to generate changing encrypted identifiers.

These and other aspects of the present invention will become apparent to those skilled in the art after a reading of the following description of the preferred embodiment when considered with the drawings, as they support the claimed invention.

DETAILED DESCRIPTION

Figure 1:
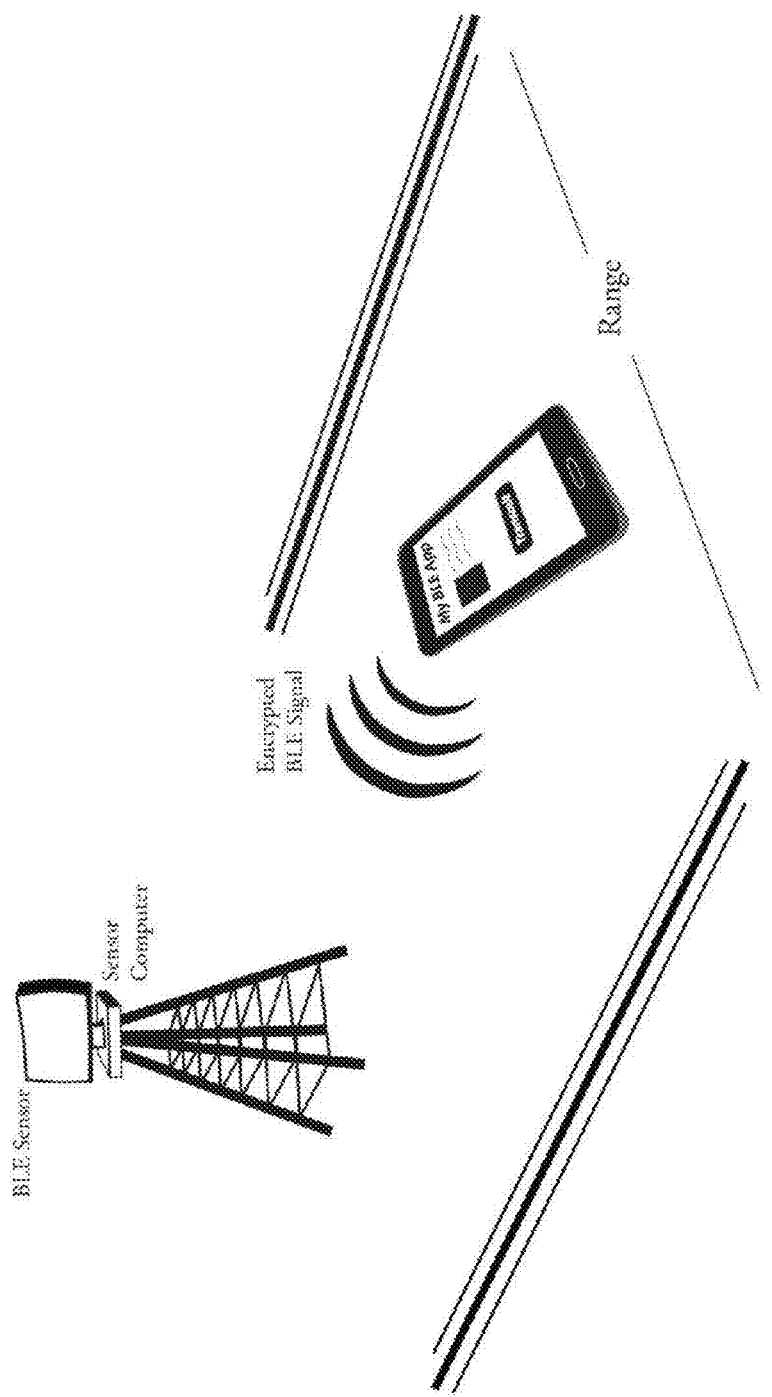
FIG. 1 is a diagram of BLE transmission and range in one embodiment of the present invention.

The present invention provides systems and methods for identifying and authenticating mobile devices in designated locations. A mobile device downloads and activates a mobile application ("app"), and provides identification information to be stored in the BAS. The mobile device then transmits Bluetooth Low Energy (BLE) signals containing encrypted identification information. A sensor receives the BLE signals when the mobile device is within range and communicates to a Backend Account System (BAS). The BAS validates and authenticates the user identification, corresponding functions and actions are executed, and a response is sent to the sensor. The mobile device receives the response from the backend system at a later point regarding the execution of the functions and/or actions. Additionally, the mobile device user can query for the history of transactions at any time.

The proposed invention is a Location-Based Automated Authentication System (LBAAS). The LBAAS involves a secure platform for identifying specific users in designated geographic locations. In the present invention, an Encrypted Transitory Identifier (ETID) is transmitted via a BLE signal from a mobile device through a BLE sensor and into the BAS system; and the ETID is resolved at the BAS system into a Unique Identifier (UID) and Changing Encrypted Identifier (CEID) that are used to recognize and authenticate a user.

The ETID is a dynamic and temporary transmission from a user's mobile device. The Back-end Account System (BAS) uses a function in the form of $f_x(ETID)=UID+CEID$ to decode and translate a valid ETID into a static UID associated with a user and a CEID.

The entire LBAAS consists of three major components: a mobile application that broadcasts using BLE, a sensor, and a BAS. These components and their functions are described below in Table 1.

TABLE 1

System Component Descriptions & Functions

| Component | Composition | Function |
|---|---|---|
| Mobile Application | A software program running on a mobile device | Transmits ETID via BLE when activated by user |
| A sensor | A computer with an attached antenna capable of receiving BLE signals, strategically placed and calibrated based on system functions and requirements | Receives the BLE signals, decodes EITD, and communicates with the BAS |
| Back-end Account System (BAS) | A remote computer and data store | Stores user information needed by the system to perform its function; generates and stores a UID; resolves and validates the CEID from mobile device |

In one embodiment, the sensor consists of a Linux based computer with an attached 2.4 GHz high-gain directional antenna. The sensor is in a ready state to collect input from an application running on a mobile device within its immediate vicinity. The mobile application is designed for devices that have Bluetooth 4.0, capable of emitting BLE signals. The BAS runs on a remote set of Linux based computers with sufficient capacity to handle many concurrent lookups from multiple sensors. In one embodiment, the BAS is configured for a specific application, such as a toll gate scenario, on a platform tailored to system requirements. This can be one or more computers or on a cloud-based platform, which is able to host many different BAS systems for different applications.

All mobile devices are first registered in the BAS in order to identify and authenticate users. A user downloads and activates a mobile application to a mobile device, and provides identification information to be stored in the BAS. This identification information is used to create a UID as an index for the user. A Changing Time Interval (CTI) for the system is also saved to a user's account along with other account parameters and data to act as a seed in the creation of CEIDs on both the mobile device and the BAS.

Figure 2:
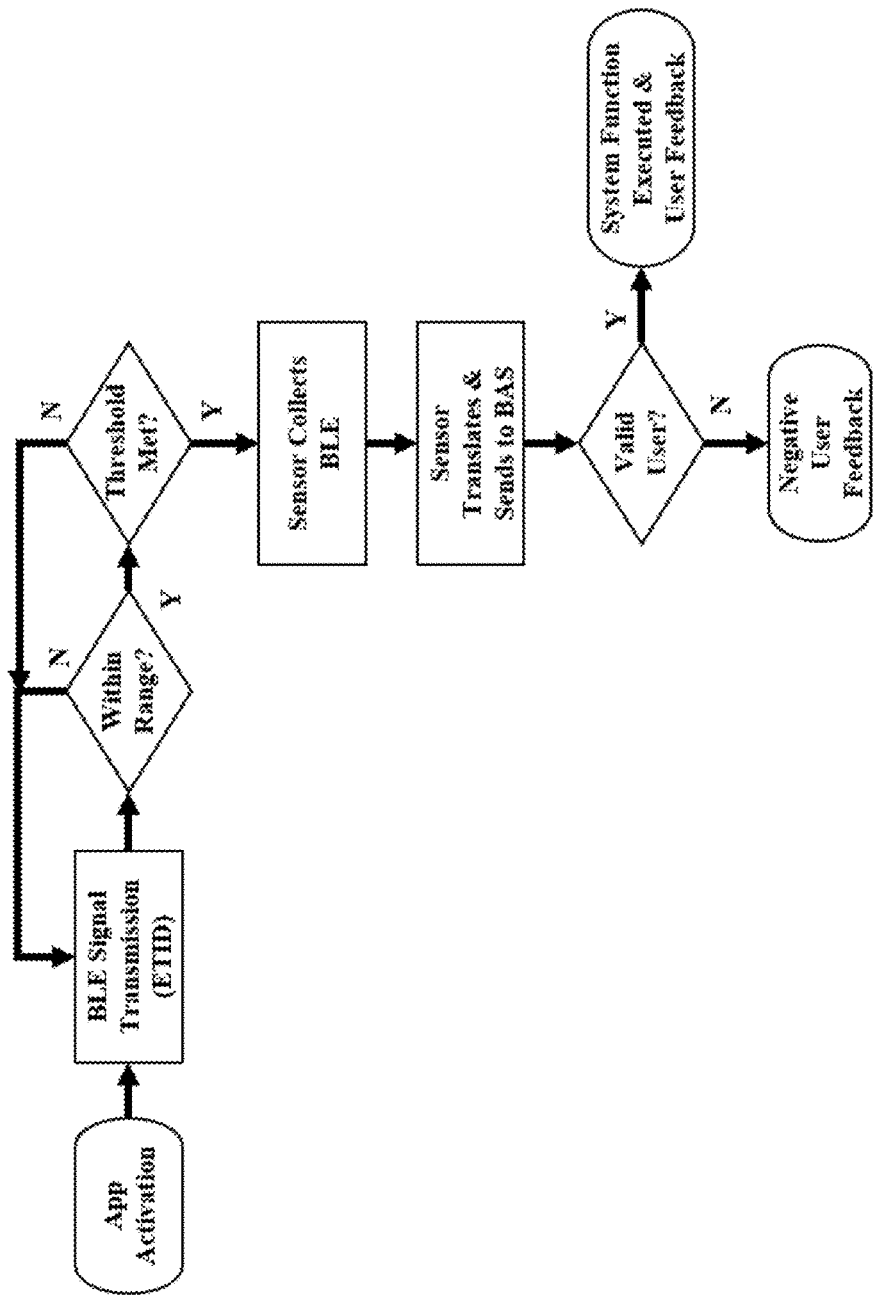
FIG. 2 is a flowchart of the automated authentication process in one embodiment of the present invention.

FIG. 1 is a diagram of BLE transmission and range in one embodiment of the present invention. During a normal operation, the mobile application generates and transmits an ETID via BLE, and a sensor recognizes and reads BLE signals along with their corresponding signal strengths. The mobile device is within the detection rage of the sensor when a signal strength threshold is met. The sensor receives the emitted BLE signal, decodes the ETID, and passes it to the BAS for confirmation of a valid user. The BAS extracts a UID and CEID from the ETID, validate the user's identity, returns a response depending on the application to the sensor, and then performs other specific system functions and operations, e.g., billing, e-mail, text notifications to the originating mobile device, or generating system logs. If it is a valid user, a corresponding system function (e.g., raising a gate or activating a light) is executed and the response provides positive user feedback. If it is not a valid user, the response provides negative user feedback. FIG. 2 illustrates the Automated Authentication Process in one embodiment of the present invention. Feedback for unauthorized users on their mobile devices is limited based on whether they have active accounts in the BAS.

Figure 3:
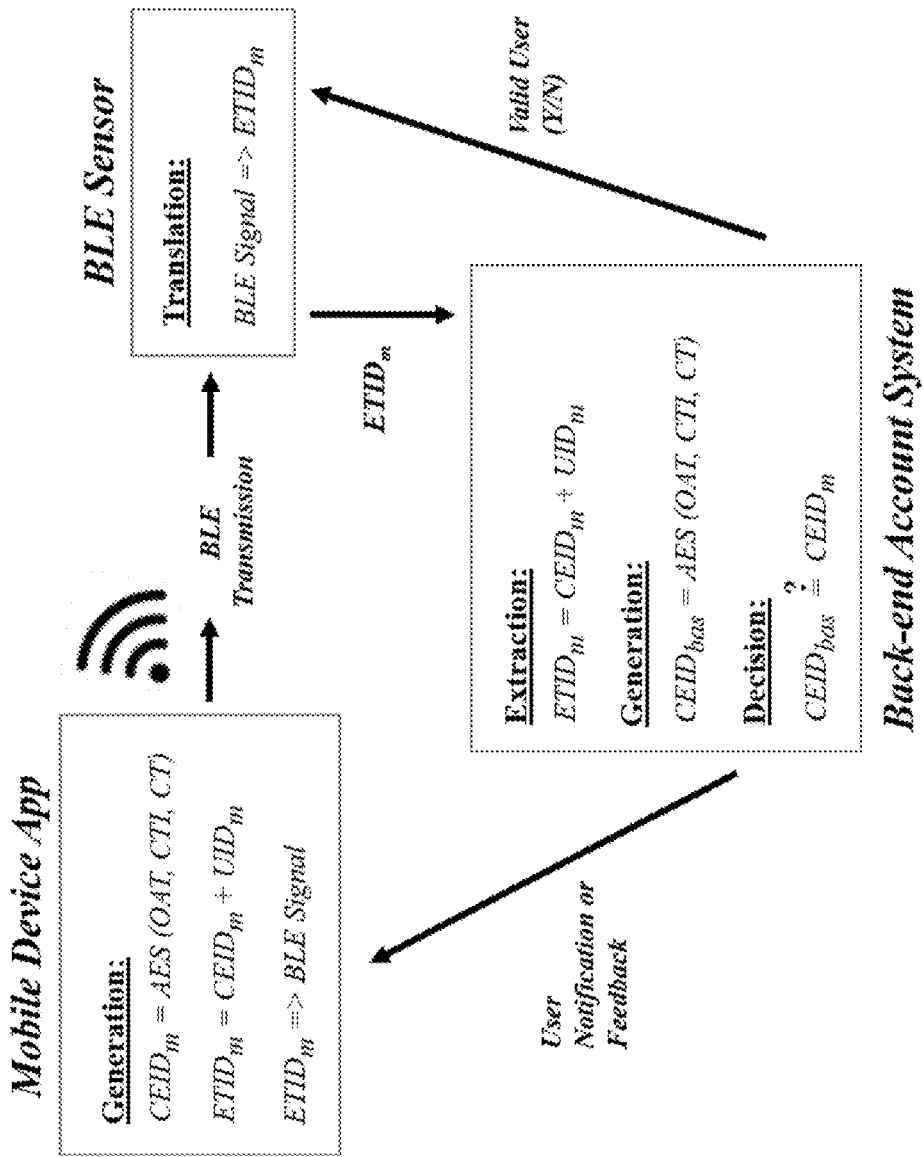
FIG. 3 is a diagram of architecture data flow for the authentication process in one embodiment of the present invention.

FIG. 3 illustrates a data flow architecture for user authentication.

When a user first downloads and opens the mobile application, they provide information to populate the BAS. There are a few other key parameters automatically collected or generated including a Changing Time Interval (CTI), an Original Account Timestamp (OAT), a Unique ID (UID), and Unique Encryption Key. These parameters are stored in both the BAS and the non-volatile memory of the mobile device; and are required to identify and authorize the particular mobile device in real time.

Once all the necessary parameters are created and stored, the authentication process begins when a user turns on the application and BLE signals are emitted from the mobile device. Preferably, a user verification step, for example, a pin, a fingerprint, or a voice password, is needed for turning on the mobile application for security purposes. For example, an application may require the use of verification for a limited time to prevent unauthorized use of the mobile device. The content of the BLE signal is generated from a series of proprietary steps that effectively provide a unique secure algorithm that runs in the background of the application. The OAT, CTI, and the Current Timestamp (CT) is used to calculate a value for user authentication. This value is then encrypted with an Advanced Encryption Standard (AES) algorithm using the Unique Encryption Key. The result is reduced into a usable size and known as the CEID. The CEID is then combined with the UID to create the ETID that is packaged and transmitted in a unique BLE signal. The present invention provides secure user identification transmission over BLE signals, because the CEIDs in the BLE signals change over time based on the algorithm used to create the CEIDs. This way, the BLE signals cannot be emulated, copied or replayed.

A calibrated BLE sensor reads BLE signals that are within range and translates the BLE signals from the mobile device into the ETID. The sensor then connects to the BAS to transfer the ETID.

The BAS extracts the UID from the ETID. The UID is used to look up the specific user parameters. The BAS performs the same algorithm as that of the mobile device, and generates a CEID using the CTI, the OAT, the CT, and the Unique Encryption Key. The BAS then compares the extracted CEID (from the ETID sent by the sensor) with the generated CEID to validate the user.

If the CEIDs match, the functions and/or actions of the system are carried out (e.g., flash an indicator or open a gate, and charging an account). If the values do not match, no further functions or actions are necessary. In either case, the BAS sends the successful or failed response back to the sensor so it may complete the transaction at the point of BLE reception.

The proposed system transforms an insecure open-source BLE format into a secure proprietary solution for automated transactions by the use of encryption, synchronous clocks, and highly sophisticated algorithms. With the unique security solution, the system is able to identify and authenticate users while preventing replay attacks. It is virtually impossible for someone to eavesdrop on someone else's BLE signal and retransmit the same signal.

Many mobile applications use BLE technology to scan for signals that trigger some other action. Typically, the mobile device is used as a scanner and not as a broadcaster. However, the proposed invention reverses the direction of the data flow. Instead of receiving signals, the mobile device in the present invention is broadcasting signals in the background of the phone with virtually no battery consumption. By reversing the data direction and using BLE, the proposed architecture has a relatively low impact on mobile device battery levels. BLE can be active for days without any substantial drain on battery resources.

In the present invention, there is no initiation by the mobile device for communication with a computer system in order to exchange messages for authentication, and there is no connection needed between the mobile device and the BAS to complete a transaction. The mobile device merely emits BLE signals containing a CEID. Once the sensor receives the BLE signals, the authentication process is done between the sensor and the BAS.

The unique broadcasting feature also enables the application to perform with very little network connection. A network is only needed during registration to connect the mobile device to the BAS. Once this information is recorded, the Automated Authentication Process is performed without network connection between the mobile device and the BAS. The receiving device is a stationary sensor which can be attached to a constant power source and handle all networking requirements. In other words, the mobile device merely emits BLE signals and the identification and authentication is done on the sensor and the BAS.

The mobile device application and the BAS are highly customizable. The area within which a sensor will detect a BLE signal and the signal strength required to trigger the user authentication can be adjusted to meet requirements of different applications and/or tasks. Sensors can also be placed in a variety of different locations. Possible applications include: tolls, gates, entrances, garages, boat lifts, ski lifts, etc.

The present invention is applicable to places where Radio Frequency Identification (RFID) or Near Field Communication (NFC) technologies are used for identification authentication and validation. The encrypted BLE transmission by mobile devices in the present invention provides a comparably secure and more convenient mechanism for user identification. The use of both one-way identification and processing application on a single user device makes this a more convenient platform for user validation.

Use Case 1: Toll Collection

Figure 4:
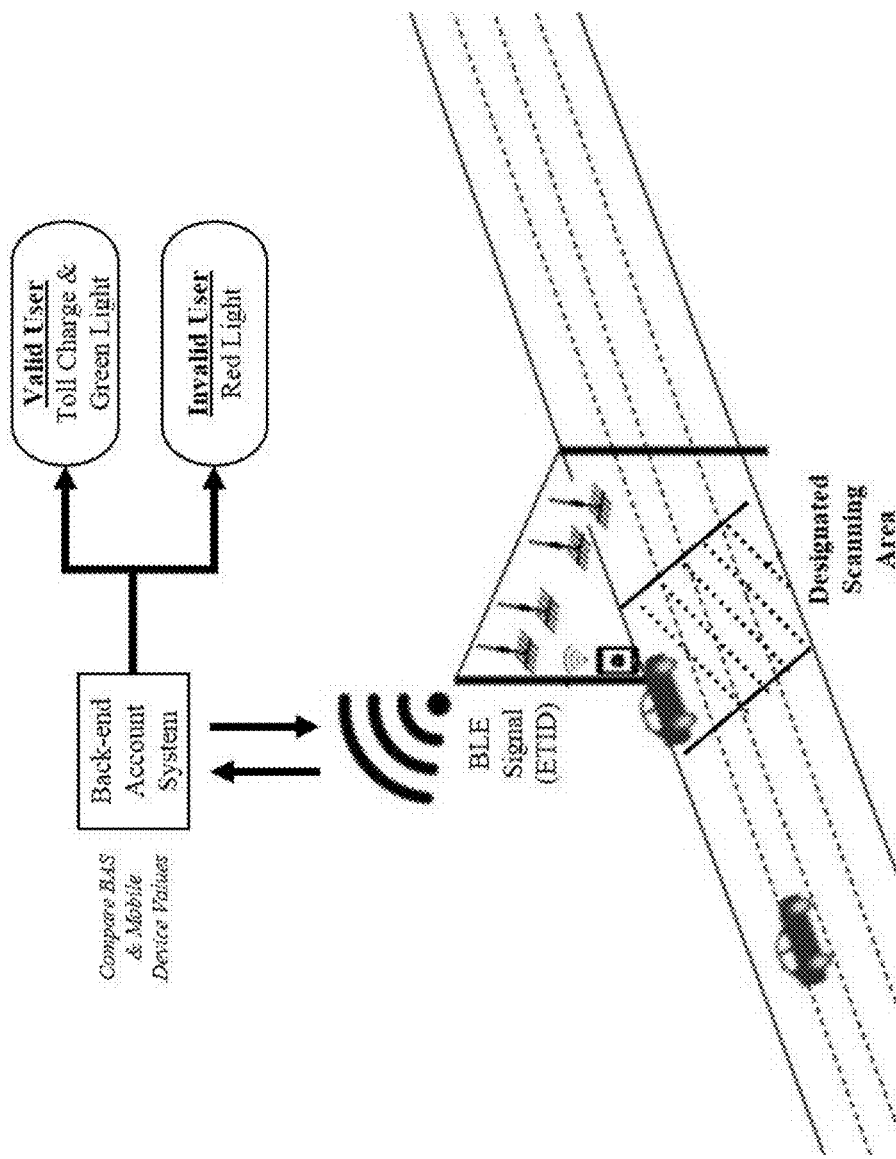
FIG. 4 is an illustration of a toll lane use case in one embodiment of the present invention.

In one embodiment, the use of BLE enables a secure low energy solution for toll collection systems as shown in FIG. 4.

During a preliminary phase, BAS data requirements are defined and then the BAS is set up with a network connection; sensors are installed, calibrated, and connected to given toll locations; and users download an app to their mobile devices and enter all required account information. Changing Time Interval, Original Timestamp, UID, Unique Encryption Key are automatically generated and saved to the user system account. Users provide credit card or bank information, billing addresses, valid vehicle plate numbers, and other personal information.

During an execution phase, a user gets in the car and turns on the application on his mobile device. The application generates a CEID using a secure algorithm and combines the CEID with the user's UID to create an ETID. The ETID is packaged and broadcast via a BLE signal. The BLE signal is continuous, but the ETID being broadcast changes based on the defined Changing Time Interval. As the car approaches the toll booth, the toll booth sensor starts to receive the BLE transmission. The mobile device is within range when a predetermined signal strength threshold is met. The toll booth sensor reads the BLE signal and translates it into the ETID. The toll booth sensor connects to the BAS and sends the ETID. The BAS receives the ETID and separates it into the UID and CEID. The BAS looks up the user system account using the UID separated from the received ETID. The parameters saved to the user system account within the BAS, including Changing Time Interval, Original Timestamp, UID, and Unique Encryption Key, are used to synthesize a CEID with the same algorithm used by the mobile device application. The BAS compares the synthesized CEID to the one received from the mobile device (via BLE and the toll booth sensor). If the CEIDs match, a license plate photo is taken for secondary verification; the user credit card or bank account is charged; a log or invoice is generated and sent to the user's mobile applications; and the light on the toll booth turns green. If the CEIDs do not match, a license plate photo could be taken for secondary verification or ticketing. For further integration, if the plate photo is verified and the account is charged, a log is generated and sent to the application to notify the user that the account was successfully charged, and the light on the toll booth turns green. If the plate photo is not verified, the light on the toll booth turns red.

Use Case 2: Gated Entrance Admission

In one embodiment, the present invention is used for admitting to gated facilities, for example, a gated neighborhood, a garage, an entrance to a factory or other facilities, etc. A BAS is set up with specific data requirements for gated entrance admission. A gate sensor at the gated entrance is installed, calibrated and connected to the BAS in network communication. Authorized users download an app to their mobile devices and enter all required information. For example, authorized license plate numbers, authorized user names, work identifications, phone numbers, and other personal information for people who are authorized to enter a gated facility. Changing Time Interval, Original Timestamp, UID, Unique Encryption Key are automatically generated and saved to corresponding user system accounts.

A user turns on the app on his mobile device. The app generates a CEID using a secure algorithm and combines the CEID with the user's UID to generate an ETID. The ETID is packaged and broadcast via a BLE signal. The BLE signal is continuous, but the ETID changes based on the defined Changing Time Interval. As the user approaches the gated entrance, the gate sensor starts to receive the BLE transmission. The mobile device is within range when a predetermined signal strength threshold is met. The gate sensor reads the BLE signal and translates it into the ETID. The gate sensor then sends the ETID to the BAS. The BAS receives the ETID and separates it into the UID and CEID. The BAS looks up the user system account using the UID separated from the received ETID. The parameters saved to the user system account within the BAS, including Changing Time Interval, Original Timestamp, UID, and Unique Encryption Key, are used to synthesize a CEID with the same algorithm used by the mobile device application. The BAS compares the synthesized CEID to the one received from the mobile device (via BLE and the gate sensor). If the CEIDs match, a gate light turns green and the gate is open for the user automatically; and the user may receive a notification on the mobile device regarding the admission at a later time. If the CEIDs do not match, the gate light turns red and the gate keeps closed, and the user receives a notification for denial.

Use Case 3: Employee Access

In one embodiment, the present invention is used for employee access authentication. For example, in a large company campus, there are different departments, usually employees are only authorized to enter the department they work at and public space, only certain employees such as high-level management personnel can access to multiple departments. For example, only laboratory staff and executives are allowed to enter a certain laboratory. A BAS is set up with specific data requirements for the laboratory entrance. A sensor at the entrance is installed, calibrated and connected to the BAS in network communication. Authorized employees download a mobile app to their mobile devices and enter all required information. For example, work identifications, employee names, phone numbers, and other employment related data for employees who are authorized to enter the laboratory. Changing Time Interval, Original Timestamp, UID, Unique Encryption Key are automatically generated and saved to the corresponding employee system accounts on both the mobile app and the BAS.

An employee turns on the app on his mobile device. At this point, the application may request a fingerprint scan to verify user identity. The fingerprint can be sent to the BAS to verify the user identity for a defined short interval. This activity will essentially authenticate the holder of the device as the individual authorized for entrance. The app generates a CEID using a secure algorithm and combines the CEID with the employee's UID to generate an ETID. The ETID is packaged and broadcast via a BLE signal. The BLE signal is continuous, but the ETID changes based on the defined Changing Time Interval. As the employee approaches the entrance to the laboratory, the sensor at the entrance of the laboratory starts to receive the BLE transmission. The mobile device is with range when a predetermined signal strength threshold is met. The sensor reads the BLE signal and translates it into the ETID. The sensor then sends the ETID to the BAS. The BAS receives the ETID and separates it into the UID and CEID. The BAS looks up the employee system account using the UID separated from the received ETID. The parameters saved to the employee system account within the BAS, including Changing Time Internal, Original Timestamp, UID, and Unique Encryption Key, are used to synthesize a CEID with the same algorithm used by the mobile app. The BAS compares the synthesized CEID to the one received from the mobile device (via BLE and the sensor). If the CEIDs match, the entrance is unlocked and open for the employee automatically; and the employee receives a notification for successful admission. If the CEIDs do not match, the entrance keeps locked and closed, and the employee receives a notification for denial.

Such an employee access authorization system provides security and convenience for employee access, especially when an employee approaches to an entrance to his department with his hands full. The employee does not have to try to free up his hands for keying in a password or swiping a card or tapping a card in order to unlock and open the door, as along as the mobile application described in the present invention is turned on, the entrance is unlocked and open automatically once the employee gets to the proximity of the entrance and his identification is verified by the system as described above.

User Case 4: Loyalty Identification Recognition

In one embodiment, the present invention is used for presenting loyalty identification and making payment at a retail store. For example, a grocery store has its mobile application and the location-based automated authorization function is incorporated into the grocery store mobile app. A BAS is set up with specific data requirements for recognizing loyalty identification and making payment. At least one point of sale (POS) station is calibrated to receive BLE signals and connected to the BAS in network communication. Customers in the store loyalty program download the store app to their mobile devices and enter all required information. For example, customer names, phone numbers, member identification numbers, bank account information, billing addresses, and other associated information. Changing Time Interval, Original Timestamp, UID, Unique Encryption Key are automatically generated and saved to corresponding loyalty system accounts.

A loyalty member turns on the store app on his mobile device. The store app generates a CEID using a secure algorithm and combines the CEID with the user's UID to generate an ETID. The ETID is packaged and broadcast via a BLE signal. The BLE signal is continuous, but the ETID changes based on the defined Changing Time Interval. As the loyalty member scans items in the cart at a POS station, the POS station starts to receive the BLE transmission. The mobile device is within range when a predetermined signal strength threshold is met. The POS station reads the BLE signal and translates it into the ETID. The POS station then sends the ETID to the BAS. The BAS receives the ETID and separates into the UID and CEID. The BAS looks up the loyalty system account using the UID separated from the received ETID. Parameters saved to the loyalty system account within the BAS, including Changing Time Interval, Original Timestamp, UID, and Unique Encryption Key, are used to synthesize a CEID with the same algorithm used by the store app. The BAS compares the synthesized CEID to the one received from the mobile device (via BLE and the point of sale station). If the CEIDs match, loyalty points and/or discounts are applied, the loyalty member's credit card or bank account is charged and a receipt is generated and sent to the loyalty member's store app automatically when the customer is ready to check out. If the CEIDs do not match, the customer is asked to provide other types of payment to check out.

Customers do not have to carry their credit cards and debit cards and membership cards and coupons and other physical payment mediums in a physical wallet when they shop in a store. A store app integrated with the location-based automatic authentication in the present invention enables a secure and convenient mobile payment for in-store shopping.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for location-based automated authentication, comprising:
   a user device, a sensor and a backend platform;
   wherein the sensor and the backend platform are in network communication;
   wherein the user device is operable to construct a Bluetooth Low Energy (BLE) signal through:
      constructing a unique value based on an original account timestamp, a changing time interval, and a current timestamp;
      encrypting the unique value with a unique encryption key and compressing the encrypted unique value to derive a changing encrypted identifier, wherein the changing encrypted identifier changes based on the changing time interval;
      combining the changing encrypted identifier with a unique identifier to form an encrypted transitory identifier;
      packaging the encrypted transitory identifier into the BLE signal;
   wherein the user device is operable to continuously transmit the BLE signal comprising the encrypted transitory identifier;
   wherein the sensor is operable to receive the BLE signal from the user device when the user device is within a predetermined range, and transmit the encrypted transitory identifier comprised in the BLE signal to the backend platform;
   wherein the backend platform is operable to:
      extract the unique identifier and the changing encrypted identifier from the received encrypted transitory identifier;
      retrieve user identification parameters based on the unique identifier, wherein the user identification parameters include the original account timestamp, the changing time interval, the current timestamp, and the unique encryption key;
      construct a second unique value based on the user identification parameters;
      encrypt the second unique value with the unique encryption key and compress the encrypted second unique value to derive a second changing encrypted identifier;
      validate a user identification by comparing the second changing encrypted identifier and the extracted changing encrypted identifier;
      charge a user account according to a predefined amount upon validating the user identification; and
      generate and store a log of charges and send a charge notification to the user device.

2. The system of claim 1, wherein the user device is further operable to download and activate an application program and send the user identification parameters to the backend platform through the application program.

3. The system of claim 2, wherein the backend platform is further operable to store the user identification parameters in the user account.

4. The system of claim 2, wherein the user identification parameters further comprise at least one from the group consisting of user names, phone numbers, work identification numbers, member identification numbers, financial account information, billing information and other personal information.

5. The system of claim 1, wherein the predetermined range is defined based on a signal strength threshold.

6. The system of claim 1, wherein the user device and the backend platform have the same algorithm for generating the changing encrypted identifier and the second changing encrypted identifier.

7. The system of claim 1, wherein the user identification is validated when the second changing encrypted identifier and the extracted changing encrypted identifier match.

8. The system of claim 7, wherein the backend platform is further operable to execute an action when the user identification is validated.

9. The system of claim 1, wherein the backend platform is further operable to send a notification to the sensor regarding a validation result.

10. The system of claim 9, wherein the user device is further operable to receive the notification from the backend platform.

11. A method for location-based automated authentication, comprising:
   a user device constructing a unique value based on an original account timestamp, a changing time interval, and a current timestamp;
   the user device encrypting the unique value with a unique encryption key and compressing the encrypted unique value to derive a changing encrypted identifier, wherein the changing encrypted identifier changes based on the changing time interval;
   the user device combining the changing encrypted identifier with a unique identifier to form an encrypted transitory identifier;
   the user device packaging the encrypted transitory identifier into a Bluetooth Low Energy (BLE) signal;
   the user device continuously transmitting the BLE signal;
   a sensor receiving the BLE signal when the user device is within a predetermined range;
   the sensor communicating the encrypted transitory identifier comprised in the BLE signal to a backend platform via network communication;
   the backend platform receiving the encrypted transitory identifier;
   the backend platform extracting the unique identifier and the changing encrypted identifier from the received encrypted transitory identifier;
   the backend platform retrieving user identification parameters based on the unique identifier, including the original account timestamp, the changing time interval, the current timestamp, and the unique encryption key and constructing a second unique value based on the user identification parameters;
   the backend platform encrypting the second unique value with the unique encryption key and compressing the encrypted second unique value to derive a second changing encrypted identifier;
   the backend platform validating a user identification by comparing the second changing encrypted identifier and the extracted changing encrypted identifier; and the backend platform providing a visual indication of a successful validation or an unsuccessful validation.

12. The method of claim 11, further comprising the user device downloading and activating an application program and sending the user identification parameters to the backend platform through the application program.

13. The method of claim 12, further comprising the backend platform storing the user identification parameters in a user account.

14. The method of claim 11, further comprising the backend platform executing an action when the second changing encrypted identifier and the extracted changing encrypted identifier match.

15. The method of claim 11, further comprising the backend platform sending a notification to the sensor regarding a result of the validation, and the user device receiving the notification from the backend platform.

* * * * *